Aug. 9, 1966   A. A. HAIGH ETAL   3,265,025
BOAT FOR HOUSE TRAILERS

Filed Jan. 11, 1965   2 Sheets-Sheet 1

INVENTORS
ARTHUR A. HAIGH
JOHN B. BURKMEYER
BY
Knox & Knox

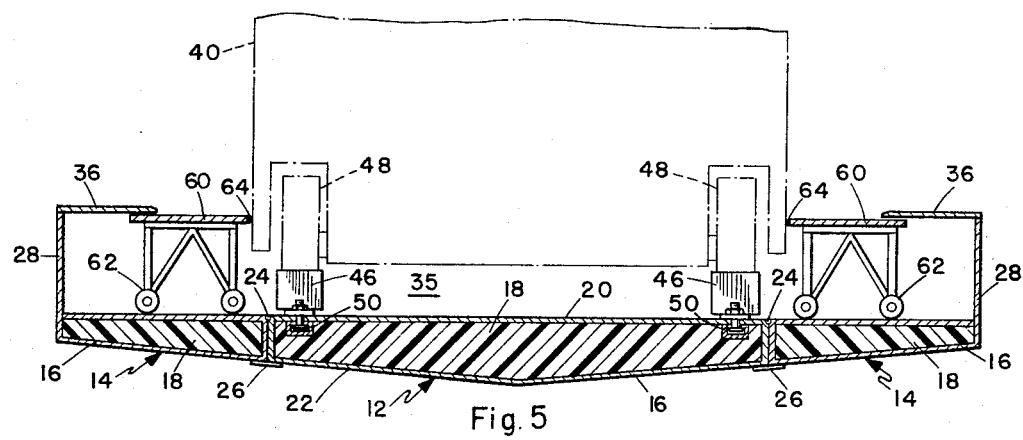
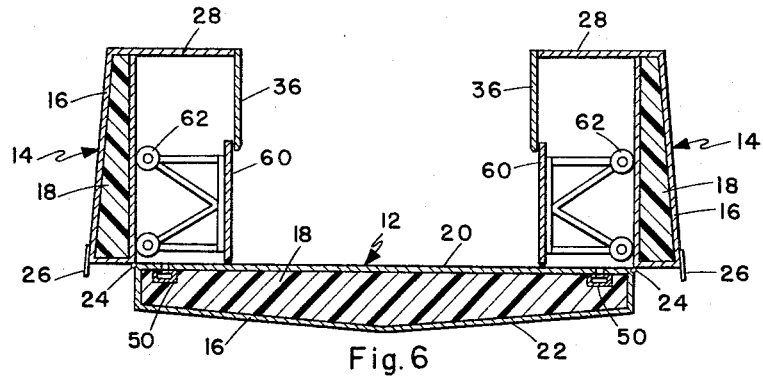
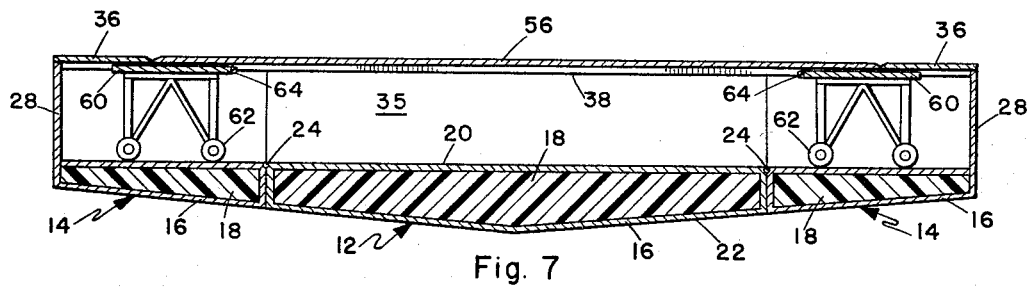

3,265,025
BOAT FOR HOUSE TRAILERS
Arthur A. Haigh, 8634 Harjoan St., and John B. Burkmeyer, 6434 Burgundy St., both of San Diego, Calif.
Filed Jan. 11, 1965, Ser. No. 424,660
10 Claims. (Cl. 114—60)

The present invention relates to boats and more specifically to a boat for house trailers.

There are a great many house trailers in present use, particularly the smaller sizes and the smallest types known as camping trailers. When it is desired to travel over water, the trailer is usually parked and the necessary equipment transferred to a boat, which is usually more confined and has less conveniences than a trailer. Specially equipped house boats are usually large and are confined to the water.

The primary object of this invention, therefore, is to provide a boat on which a house trailer can be carried, complete with all its equipment and conveniences, the boat being adapted for easy loading of the trailer thereonto and comprising an unsinkable platform within an enclosed well.

Another object of this invention is to provide a trailer carrying boat having a raised deck which is disposed near the level of the trailer door, so eliminating the need for steps to the door.

Another object of this invention is to provide a trailer carrying boat in which deck portions are adjustable to fit closely around the trailer and form an unbroken walkway of maximum useful area.

A further object of this invention is to provide a trailer carrying boat which itself is readily foldable to facilitate transportation on land when necessary.

In the drawings:

FIGURE 5 is an enlarged sectional view taken on line 5—5 of FIGURE 1;

FIGURE 6 is a similar sectional view, but showing the boat folded; and

FIGURE 7 is an enlarged sectional view taken on line 7—7 of FIGURE 1.

Similar characters of reference indicate similar or identical elements and portions throughout the specification and throughout the views of the drawing.

Figure 1:
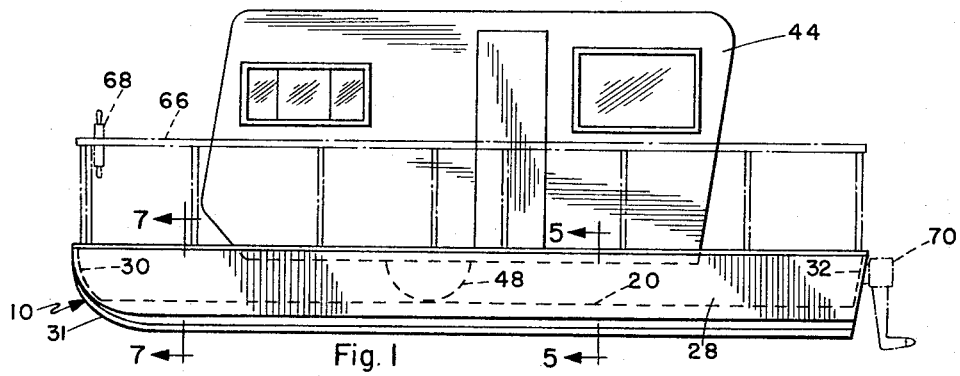
FIGURE 1 is a side elevation view of the boat with a trailer in place.

The boat has a buoyant hull 10 comprising a central portion 12 and side portions 14, each constructed with a skin or shell 16 and filled with buoyant material 18, such as plastic foam. Shells 16 can be of metal, glass fiber, reinforced plastic, or other sheet-like or formable material, and load bearing structural members can be incorporated in any locations as needed according to the size of the boat. The upper surface of the hull 10 forms a flat deck 20, while the lower surface 22 is a shallow V-form for stability and minimum draft. Side portions 14 are attached to the central portion 12 by hinges 24 extending longitudinally along the deck 20, so that the sides can swing up to reduce the width of the boat and permit transportation on a highway. In the extended position the side portions 14 are held rigidly to central portion 12 by suitable straps 26, or similar fastening means on the lower surface 22.

The boat is provided with fixed side walls 28, a front wall 30, which can be curved to form a bow 31, and a rear wall or transom 32 containing a ramp 34 hinged at the deck 20 to swing down and to the rear. The width of ramp 34 is sufficient to allow loading of a trailer into the enclosed well 35 of the boat, as hereinafter described. Extending inwardly from the upper edges of side walls 28 are fixed upper deck panels 36, joined at the forward end by a fixed front deck panel 38. At the rear are rear deck panels 40 hinged to the inner edges of panels 36 and meeting at the center, the inner ends being supported by legs 42 to hold panels 40 in place as portions of the peripheral upper deck. The opening within the upper deck is substantially larger than conventional trailers in the size range for which the boat is designed.

Figure 4:
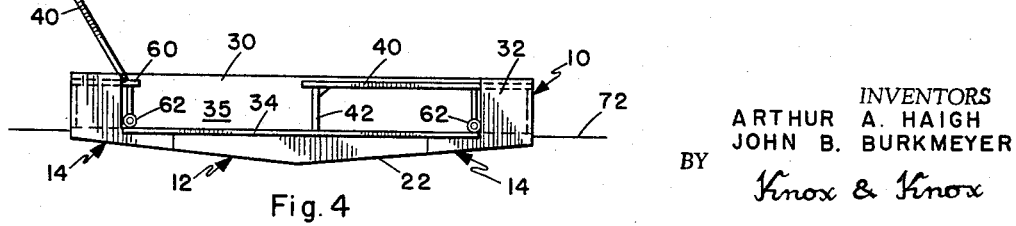
FIGURE 4 is a rear elevation view of the boat, with the loading ramp partially opened.

A typical trailer 44 is loaded into the well 35 by lowering ramp 34 and raising rear deck portions 40, as indicated in FIGURE 4. The trailer can then be rolled onto lower deck 20 and positioned as necessary. To hold the trailer in place chocks 46 are provided to engage the trailer wheels 48, said chocks being slidable in tracks 50 in the deck 20, the chocks and their means for fastening being of any suitable type. Also illustrated is a hitch post 52 mounted on a cross bar 54, which is slidable along tracks 50 and can be positioned to hold the conventional trailer towing hitch, so that the trailer is supported in level position. Other means may be used to secure a trailer, depending on the size and carriage arrangement.

With the trailer in place, the front of the upper deck is filled in by a front cover panel 56 resting on panel 38 between the side panels 36. At the rear a similar cover panel 58 is placed on the rear deck panels 40. Cover panels 56 and 58 can be adjusted to fit closely against the ends of the trailer and secured by any suitable means, such as screws, clamps, or the like.

At the sides of the boat are deck extensions 60 supported on roller carriages 62 which ride on deck 20, said extensions sliding laterally under upper deck panels 36. The extensions 60 can be slid inwardly to close against the sides of trailer 44 and may be fitted with bumper strips 64 to prevent damage to the trailer finish. A continuous deck is thus provided around the trailer and is designed to be at substantially the height of the trailer door, so that the usual access steps are not required.

Figure 2:
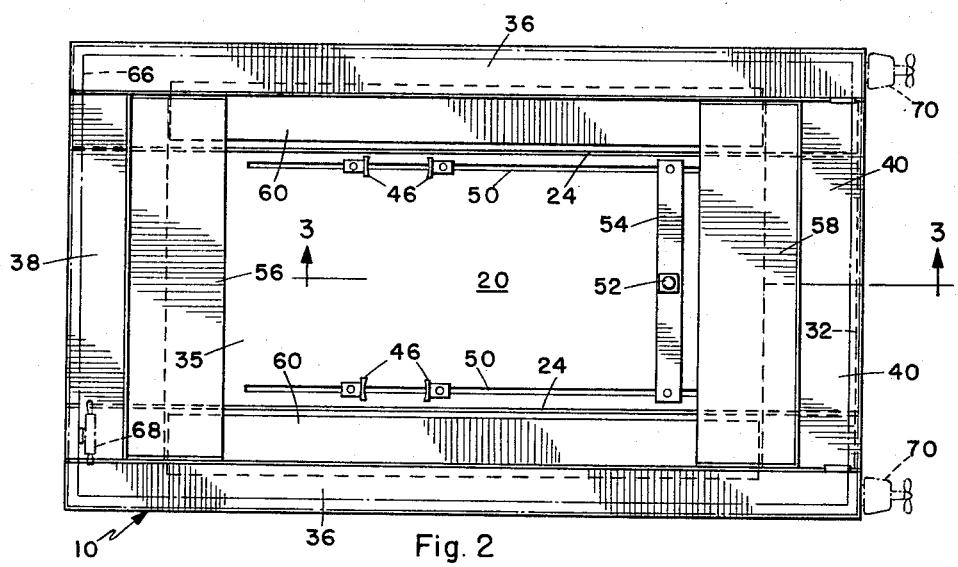
FIGURE 2 is a top plan view of the boat.
Figure 3:
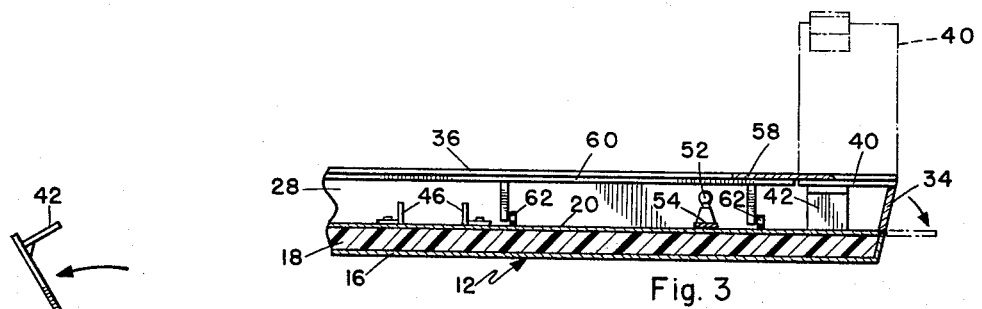
FIGURE 3 is a sectional view taken on line 3—3 of FIGURE 2.

To complete the boat, rails 66 may be fitted around the circumference of the upper deck, as indicated in broken lines in FIGURES 1 and 2, the particular arrangement being subject to variation. Suitable controls can be provided, as indicated at 68, and outboard motors 70 may be mounted at the rear for propulsion. Inboard or other propulsion means may also be used.

With the trailer recessed in the well 35, the undercarriage of the trailer is protected from spray and, due to the large wetted area of the boat the hull has a very shallow draft, the water line being below the level of deck 20, as indicated at 72 in FIGURE 4. The buoyancy of the foam filled hull makes the boat unsinkable and it is not necessary to use elaborate sealing for the ramp, the hinged hull joints, or the upper deck structure. It is, of course, desirable to keep as much water out of the well 35 as possible, but it is not critical to the safety of the boat and any sealing can be of simple type.

When it is necessary to transport the boat over land, the side portions 14 are hinged upwardly, as in FIGURE 6, and tied or otherwise secured in place, the deck extensions 60 being nested with the sides without the need for re-positioning. In this folded condition the boat will meet the maximum width requirements for normal highway travel, yet is still capable of holding a full width trailer when opened. For folding the ramp and rear deck panels would be removed and stowed in the well of the boat with the cover panels. The bow section or portions thereof could be made detachable or hinged in a suitable manner to facilitate folding. For instance, it will be obvious that the folding ramp and hinged deck structure could be applied to either or both ends of the boat, which would further facilitate loading and unloading of the trailer.

In addition to providing a walkway at a convenient level around the trailer, the raised deck covers large spaces which can be used for storage and equipment. Much permanent space is available under the side deck panels, between the roller carriages of the deck extensions, for such items as water tanks, sewage disposal means, fuel and other supplies.

It is understood that minor variation from the form of the invention disclosed herein may be made without departure from the spirit and scope of the invention, and that the specification and drawings are to be considered as merely illustrative rather than limiting.

We claim:
1. A boat for a house trailer, comprising:
a buoyant hull having a substantially flat deck;
raised walls surrounding said deck and enclosing a well;
said walls including a portion mounted for opening to admit a trailer to said well;
upper deck structure mounted on top of said walls and having portions thereof adjustable to fit closely around a trailer contained in the well.

2. A boat for a house trailer, comprising:
a buoyant hull having a substantially flat deck;
raised walls surrounding said deck and enclosing a well;
said walls including a portion mounted for opening to admit a trailer to said well;
upper deck structure fixed to portions of said walls and defining an opening over said well substantially larger than a trailer to be carried therein;
and movable deck panels adjustable to fit closely around a trailer and form extensions of the upper deck.

3. A boat according to claim 2, wherein said movable deck panels include front and rear cover panels mounted on said fixed deck structure;
and side extension panels slidable under the fixed deck structure.

4. A boat according to claim 3, wherein said side extension panels have supporting carriages riding on said flat deck.

5. A boat for a house trailer, comprising:
a buoyant hull having a substantially flat deck;
wall structure extending upwardly from said hull around said deck and enclosing a well;
a ramp in said wall structure hinged to swing downwardly;
upper deck structure mounted on said wall structure and having portions thereof adjustable to fit closely around a trailer contained in said well;
portions of said upper deck structure being movable to open when said ramp is lowered for access to said well.

6. A boat for a house trailer, comprising:
an elongated buoyant hull having a central portion and side portions longitudinally hinged thereto to swing upwardly on opposite sides;
said hull having a substantially flat deck;
side walls and end walls extending upwardly from said hull and enclosing a well;
at least one of said end walls having a portion mounted for opening to admit a trailer to said well;
upper deck panels mounted on said walls and extending inwardly therefrom;
and extension panels movably mounted with respect to said upper deck panels to fit closely around a trailer contained in said well.

7. A boat according to claim 6, wherein said end wall portion mounted for opening comprises a ramp hinged to swing downwardly;
portions of said upper deck panels over said ramp being hinged to swing back for access to said well.

8. A boat according to claim 6, wherein said extension panels include front and rear cover panels longitudinally adjustably mounted on said deck panels;
and side extension panels laterally adjustably mounted beneath said deck panels on said side portions.

9. A boat according to claim 8, wherein said side extension panels have supporting roller carriages riding on said flat deck.

10. A boat according to claim 9, wherein said side extension panels and carriages are storable in said side portions when the side portions are folded upwardly.

References Cited by the Examiner

UNITED STATES PATENTS 2,898,877    8/1959    King _____ 114—60

MILTON BUCHLER, *Primary Examiner.*

T. M. BLIX, *Assistant Examiner.*